United States Patent
Wu et al.

(10) Patent No.: US 10,057,758 B2
(45) Date of Patent: Aug. 21, 2018

(54) COMBO COMMUNICATION TERMINAL AND COMMUNICATION METHOD THEREOF

(71) Applicant: QISDA (SUZHOU) CO., Ltd., Suzhou, Jiangsu Province (CN)

(72) Inventors: Qiu Hong Wu, Suzhou (CN); Feng Chao Bai, Suzhou (CN); Guo Dong Zhao, Suzhou (CN); Wei Jin, Suzhou (CN); Wan He Qiu, Suzhou (CN)

(73) Assignee: QISDA (SUZHOU) CO., Ltd., Suzhou, Jiangsu Province (CN)

( * ) Notice: Subject to any disclaimer, the term of this patent is extended or adjusted under 35 U.S.C. 154(b) by 329 days.

(21) Appl. No.: 14/791,477

(22) Filed: Jul. 6, 2015

(65) Prior Publication Data
US 2016/0094981 A1  Mar. 31, 2016

(30) Foreign Application Priority Data
Sep. 26, 2014  (CN) .......................... 2014 1 0504602

(51) Int. Cl.
*H04W 8/18* (2009.01)
*H04W 8/20* (2009.01)

(52) U.S. Cl.
CPC ........... *H04W 8/183* (2013.01); *H04W 8/205* (2013.01)

(58) Field of Classification Search
CPC .............................. H04W 8/183; H04W 8/205
USPC .................................................. 455/558, 551
See application file for complete search history.

(56) References Cited

U.S. PATENT DOCUMENTS

| | | | | |
|---|---|---|---|---|
| 2007/0004457 A1* | 1/2007 | Han | ........................ | H04W 8/20 455/558 |
| 2009/0233602 A1* | 9/2009 | Hughes | ................. | H04W 36/00 455/436 |
| 2010/0136907 A1* | 6/2010 | Zhou | .................... | H04B 1/3805 455/41.2 |
| 2010/0173671 A1* | 7/2010 | Cha | ................... | H04W 52/0245 455/556.1 |
| 2012/0282877 A1 | 11/2012 | Amis | | |

FOREIGN PATENT DOCUMENTS

| | | |
|---|---|---|
| CN | 1574991 A | 2/2005 |
| CN | 101459700 A | 6/2009 |
| CN | 202799183 U | 3/2013 |
| CN | 202940971 U | 5/2013 |
| TW | 201419783 A | 5/2014 |

* cited by examiner

*Primary Examiner* — Chuck Huynh
(74) *Attorney, Agent, or Firm* — Winston Hsu

(57) ABSTRACT

A combo communication terminal has a first communication terminal and a second communication terminal. A switch unit of the second communication terminal has a first end, a second end, a third end and a control end. The control end selectively couples the first end to the second end or to the third end according to a control signal. When a communication link between the first communication terminal and the second communication terminal has been established, a second processing unit of the second communication terminal generates and transmits a first control signal to the control end, such that a first processing unit of the first communication terminal is coupled to a first subscriber identity unit of the second communication terminal via the first port, so that the first communication terminal uses the first subscriber identity unit to perform tasks of communication.

14 Claims, 8 Drawing Sheets

COMBO COMMUNICATION TERMINAL AND COMMUNICATION METHOD THEREOF

BACKGROUND OF THE INVENTION

1. Field of the Invention

The present invention is related to a communication device, and more particularly to a combo communication terminal and communication method thereof.

2. Description of the Prior Art

As communication terminal technology becomes more and more mature, communication terminals have become more and more diverse. The communication terminals with large touch screens are the trend in the market. Although such communication terminals satisfy the need of the consumers, but they are inconvenient to carry. Accordingly, a separable combo communication terminal, which may be separated into a large communication terminal and a small communication terminal, is presented in the current market. A user may only carry the small communication terminal to reduce his personal load.

In the prior art, in order to make one of the two communication terminals of the combo communication terminal use a SIM (Subscriber identity module) card of the other communication terminal of the combo communication terminal to implement communications, a solution is provided as follows: each communication terminal of the combo communication terminal has a SIM card and software of Android® Package (APK) is installed therein. When one of the two communication terminals needs the SIM card of the other communication terminal to carry on communications, APK should be executed by both of the two communication terminals. One of the communication terminals obtains data of the SIM card of the other communication terminal through a wireless channel (e.g. a Bluetooth® channel) to perform functions of dialing or answering the call. However, due to the instability and a limited coverage area of wireless communications, the communications between the communication terminals would be unstable. Moreover, the communication terminal is unable to use a SIM card of the other communication terminal that is in a turn-off mode or a sleep mode.

SUMMARY OF THE INVENTION

It is an objective of the present invention to provide a combo communication terminal and a communication method thereof.

In an embodiment of the present invention, a combo communication terminal is provided. The combo communication terminal comprises a first communication terminal and a second communication terminal. The first communication terminal comprises a first port and a first processing unit coupled to the first port. The second communication terminal comprises a second port, a first subscriber identity unit, a second processing unit coupled to the second port, and a switch unit. The switch unit has a first end, a second end, a third end and a control end. The first end is coupled to the first subscriber identity unit, the second end is coupled to the second port, and the third end and the control end are coupled to the second processing unit. The control end is configured to selectively couple the first end to the second end or to the third end according to a control signal. When a communication link between the first communication terminal and the second communication terminal is established through the first port and the second port, the second processing unit generates a first control signal and transmits the first control signal to the control end, such that the first subscriber identity unit is coupled to the second port and the first processing unit is coupled to the first subscriber identity unit through the first port, so that the first communication terminal uses the first subscriber identity unit to perform tasks of communication.

In an embodiment of the present invention, when the communication link between the first communication terminal and the second communication terminal is removed, the second processing unit generates a second control signal and transmits the second control signal to the control end, such that the second processing unit is coupled to the first subscriber identity unit through the third end, so that the second communication terminal uses the first subscriber identity unit to perform tasks of communication.

In an embodiment of the present invention, the first processing unit comprises a first subscriber message processing module coupled to the first port and configured to obtain a message of the first subscriber identity unit. When the communication link between the first communication terminal and the second communication terminal is established, the first communication terminal obtains the message of the first subscriber identity unit via the first subscriber message processing module and uses the message of the first subscriber identity unit to perform tasks of communication.

In an embodiment of the present invention, the second processing unit comprises a second subscriber message processing module coupled to the third end. When the communication link between the first communication terminal and the second communication terminal is removed, the second communication terminal obtains the message of the first subscriber identity unit via the second subscriber message processing module and uses the message of the first subscriber identity unit to perform tasks of communication.

In an embodiment of the present invention, the first processing unit comprises a third port coupled to the first port, and the second processing unit further comprises a fourth port coupled to the control end and the second port. When the first processing unit detects that the communication link between the first communication terminal and the second communication terminal is established, the first processing unit transmits a switch signal through the third port, the first port, the second port and the fourth port to the second processing unit. The second processing unit generates the first control signal when the second processing unit receives the switch signal.

In an embodiment of the present invention, the third port and the fourth port are general purpose input output (GPIO) ports.

In an embodiment of the present invention, when the second processing unit detects that the communication link between the first communication terminal and the second communication terminal has been established, the second processing unit generates the first control signal.

In an embodiment of the present invention, when the first communication terminal uses the first subscriber identity unit to perform tasks of communication, the second processing unit controls the second communication terminal to be in a turn-off mode or a sleep mode.

In an embodiment of the present invention, when the communication link between the first communication terminal and the second communication terminal is established, the first processing unit transmits a third signal, and the second processing unit receives the third signal and controls the second communication terminal to be in the turn-off mode or the sleep mode.

In an embodiment of the present invention, when the second processing unit detects that the communication link between the first communication terminal and the second communication terminal has been established and that the first subscriber identity unit is coupled to the second port, the second processing unit controls the second communication terminal to be in the turn-off mode or the sleep mode.

In an embodiment of the present invention, the first communication terminal further comprises at least a second subscriber identity unit, and the first processing unit further comprises at least a third subscriber message processing module corresponding to the at least a second subscriber identity unit. Each of the at least a third subscriber message processing module is coupled to the at least a second subscriber identity unit, and each of the least a third subscriber message processing module is configured to obtain a message of a corresponding one of the at least a second subscriber identity unit.

In an embodiment of the present invention, the first communication terminal further comprises a display unit. When the first processing unit detects that the communication link between the first communication terminal and the second communication terminal has been removed, the first processing unit transmits a hint message to the display unit for determining whether a call transfer should be performed.

In an embodiment of the present invention, the first communication terminal further comprises a first storage unit, and the first communication terminal further comprises a second storage unit. When the communication link between the first communication terminal and the second communication terminal is established, the first processing unit controls the second storage unit, and the second processing unit controls the first storage unit.

In an embodiment of the present invention, the first port comprises a general purpose input output (GPIO) port, and the second port comprises another GPIO port corresponding to the first port. When the communication link between the first communication terminal and the second communication terminal is established, the first communication terminal provides electric power to the second communication terminal.

In an embodiment of the present invention, a communication method adopted in a second communication terminal of a combo communication terminal is provided. The second communication terminal comprises a second port, a switch unit and a first subscriber identity unit. The combo communication terminal further comprises a first communication terminal, and the first communication terminal comprises a first port and a first processing unit. The communication method comprises: determining whether a communication link between the first communication terminal and the second communication terminal has been established through the first port and the second port; and when it is determined that the communication link has been established, adjusting the switch unit to couple the first subscriber identity unit to the first processing unit, such that the first communication terminal uses the first subscriber identity unit to perform tasks of communication.

In an embodiment of the present invention, the first communication terminal further comprises a second processing unit. The communication method further comprises: when it is detected that the communication link between the first communication terminal and the second communication terminal has been removed, adjusting the switch unit to couple the first subscriber identity unit to the second processing unit, such that the second communication terminal uses the first subscriber identity unit to perform tasks of communication.

In an embodiment of the present invention, when it is detected that the communication link between the first communication terminal and the second communication terminal has been established through the first port and the second port, it is determined that the communication link has been established.

In an embodiment of the present invention, when the communication terminal receives a switch signal, the communication terminal determines that the communication link has been established. The switch signal is transmitted from the first communication terminal to the second communication terminal when the first communication terminal detects that the communication link between the first communication terminal and the second communication terminal has been established through the first port and the second port.

In an embodiment of the present invention, the first processing unit further comprises a first subscriber message processing module, and the second processing unit further comprises a second subscriber message processing module. When it is determined that the communication link has been established, step of adjusting the switch unit to couple the first subscriber identity unit to the first processing unit comprises: when it is determined that the communication link has been established, adjusting the switch unit to couple the first subscriber identity unit to the first subscriber message processing module. When it is detected that the communication link between the first communication terminal and the second communication terminal has been removed, step of adjusting the switch unit to couple the first subscriber identity unit to the second processing unit comprises: when it is detected that the communication link between the first communication terminal and the second communication terminal has been removed, adjusting the switch unit to couple the first subscriber identity unit to the second subscriber message processing module.

In an embodiment of the present invention, the first communication terminal further comprises a second subscriber identity unit. When the first subscriber identity unit is coupled to the first processing unit, the first communication terminal selectively uses the first subscriber identity unit or the second subscriber identity unit to perform tasks of communication.

As compared to the prior art, the present invention provides a combo communication terminal and a communication method thereof. The combo communication terminal comprises a first communication terminal and a second communication terminal. The first communication terminal comprises a first port and a first processing unit coupled to the first port. The second communication terminal comprises a second port, a first subscriber identity unit, a second processing unit coupled to the second port, and a switch unit. When a communication link between the first communication terminal and the second communication terminal is established through the first port and the second port, the second processing unit controls the switch unit to couple the first subscriber identity unit of the second communication terminal to the first processing unit of the first communication terminal, so that the first communication terminal uses the first subscriber identity unit to perform tasks of communication. Moreover, the first communication terminal and the second communication terminal are coupled by using the ports directly, such that the first communication terminal is coupled to the first subscriber identity unit via the ports.

Accordingly, stability of communications between the first communication terminal and the first subscriber identity unit would be assured. Therefore, when the first communication terminal uses the first subscriber identity unit to perform tasks of communication, other modules of the second communication terminal would not be used. As a result, even though the second communication terminal is in a turn-off mode or a sleep mode, the first communication terminal also can use the first subscriber identity unit to perform tasks of communication.

These and other objectives of the present invention will no doubt become obvious to those of ordinary skill in the art after reading the following detailed description of the preferred embodiment that is illustrated in the various figures and drawings.

DETAILED DESCRIPTION

In order to better understand objectives, structures, characteristics and functions of the present invention, detailed description of exemplary embodiments of the present invention are recited as follows.

Figure 1:
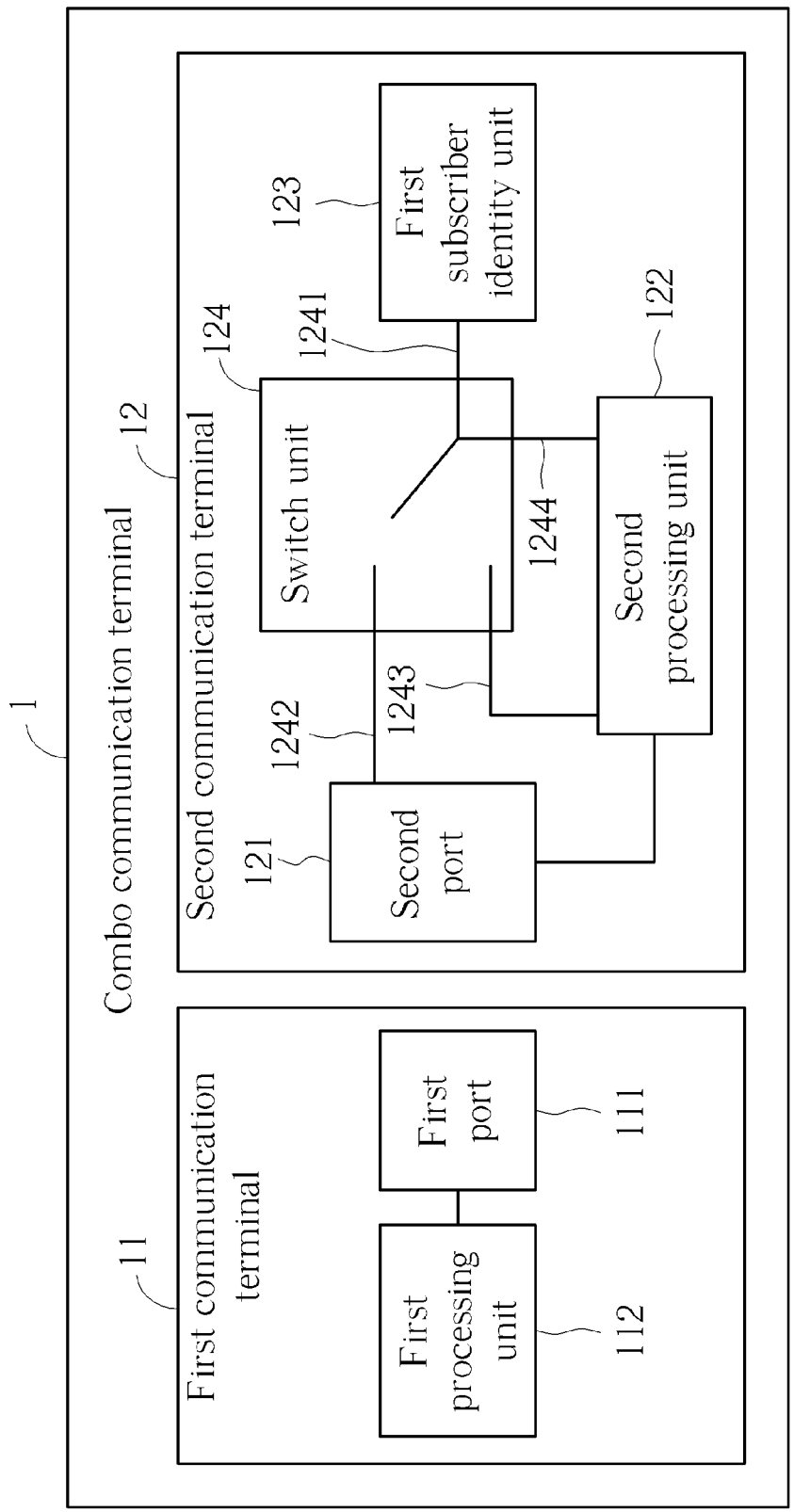
FIG. 1 is a functional block diagram of a combo communication terminal according to an embodiment of the present invention.

FIG. 1 is a functional block diagram of a combo communication terminal 1 according to an embodiment of the present invention. The combo communication terminal 1 comprises a first communication terminal 11 and a second communication terminal 12. The first communication terminal 11 comprises a first port 111 and a first processing unit 112. The first processing unit 112 is coupled to the first port 111. The second communication terminal 12 comprises a second port 121, a second processing unit 122, a first subscriber identity unit 123 and a switch unit 124. The second processing unit 122 is coupled to the second port 121. The switch unit 124 comprises a first end 1241, a second end 1242, a third end 1243 and a control end 1244. The first end 1241 is coupled to the first subscriber identity unit 123, the second end 1242 is coupled to the second port 121, and the third end 1243 and the control end 1244 are coupled to the second processing unit 122. The control end 1244 is configured to selectively couple the first end 1241 to the second end 1242 or to the third end 1243 according to a control signal. It should be noted that the first port 111 and the second port 121 match with each other. For example, the first port 111 is a male port, and the second port is a female port.

Figure 2:
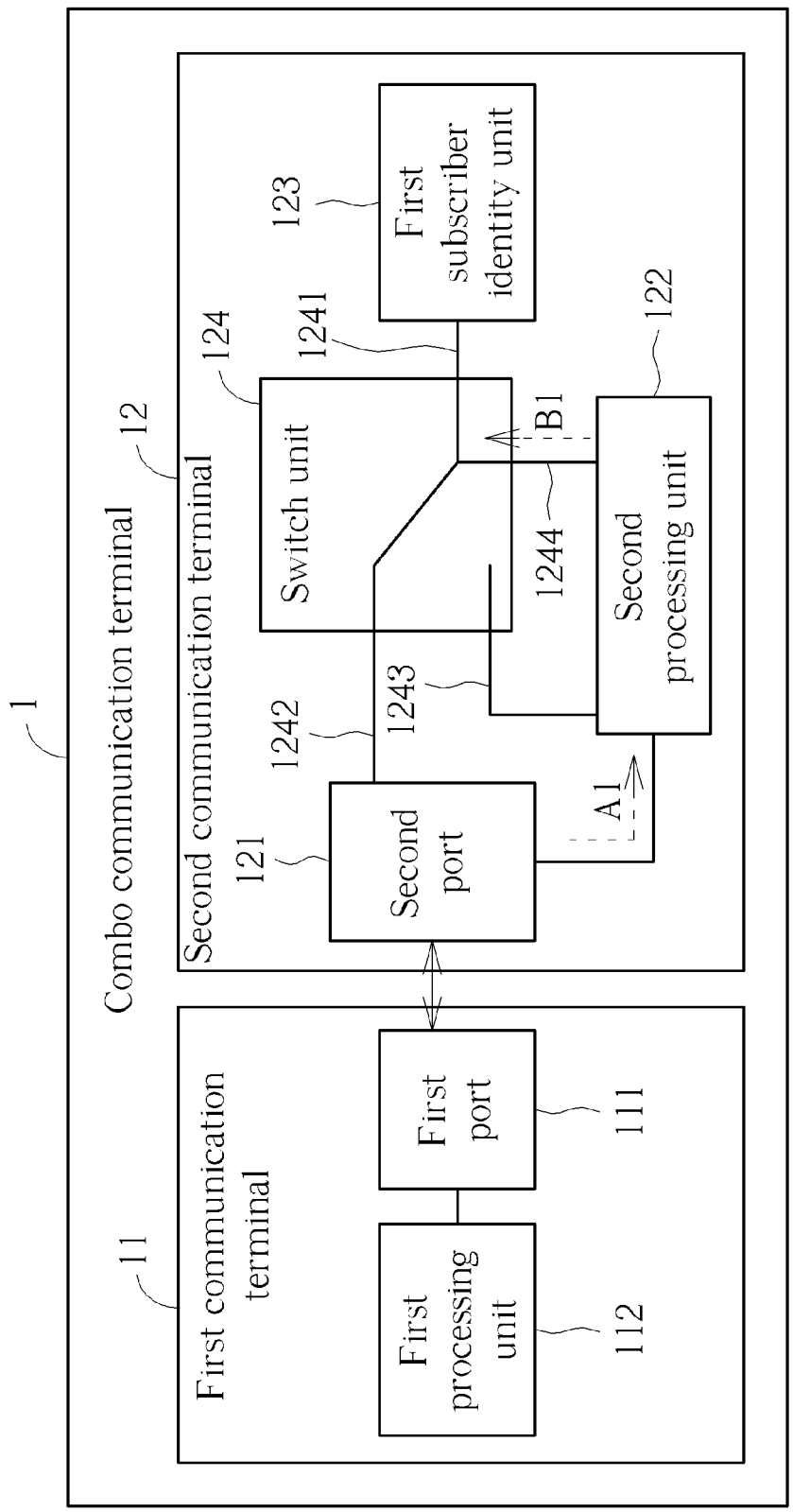
FIG. 2 illustrates a state of the combo communication terminal in FIG. 1 when a communication link between the first communication terminal and second communication terminal has been established.

As shown in FIG. 2, a state of the combo communication terminal in FIG. 1 is illustrated when a communication link between the first communication terminal 11 and second communication terminal 12 has been established. When the communication link between the first communication terminal 11 and second communication terminal 12 has been established through the first port 111 and the second port 121, the second processing unit 122 receives a signal A1. Then, the second processing unit 122 generates and transmits a first control signal B1 to the control end 1244. The control end 1244 controls the first end 1241 to couple to the second end 1242, such that the first subscriber identity unit 123 is coupled to the second port 121, so that the first processing unit 112 is coupled to the first subscriber identity unit 123 through the first port 111. Accordingly, the first communication terminal 11 uses the first subscriber identity unit 123 to perform tasks of communication.

Figure 3:
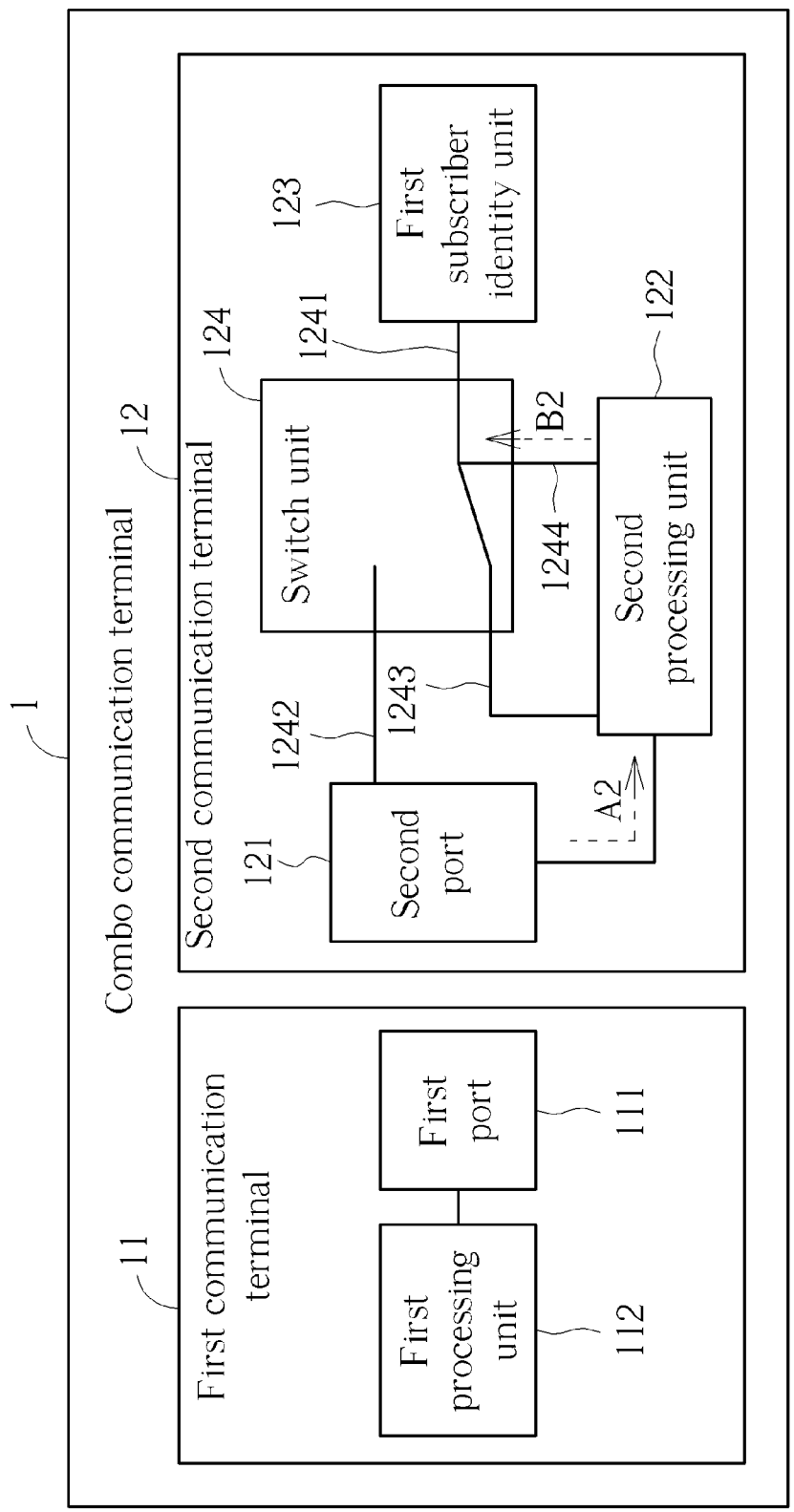
FIG. 3 illustrates another state of the combo communication terminal in FIG. 1 when a communication link between the first communication terminal and second communication terminal has been removed.

As shown in FIG. 3, a state of the combo communication terminal in FIG. 1 is illustrated when the communication link between the first communication terminal 11 and second communication terminal 12 has been removed. When the communication link between the first communication terminal 11 and second communication terminal 12 has been removed, the second processing unit 122 receives a signal A2. Then, the second processing unit 122 generates and transmits a second control signal B2 to the control end 1244. The control end 1244 controls the first end 1241 to couple to the third end 1243, such that the second processing unit 122 is coupled to the first subscriber identity unit 123 through the third end 1243. Accordingly, the second communication terminal 12 uses the first subscriber identity unit 123 to perform tasks of communication.

When the communication link between the first communication terminal 11 and the second communication terminal 12 has been established, since the first communication terminal 11 is coupled to the first subscriber identity unit 123, when the first communication terminal 11 uses the first subscriber identity unit 123 to perform tasks of communication, other modules of the second communication terminal 12 may not be used. Therefore, the mode of the second communication terminal 12 would not influence the first communication terminal 11 to use the first subscriber identity unit 123 to perform tasks of communication. Accordingly, even though the second communication terminal 12 is in a turn-off mode or a sleep mode, the first communication terminal 11 also can use the first subscriber identity unit 123 to perform tasks of communication.

Figure 4:
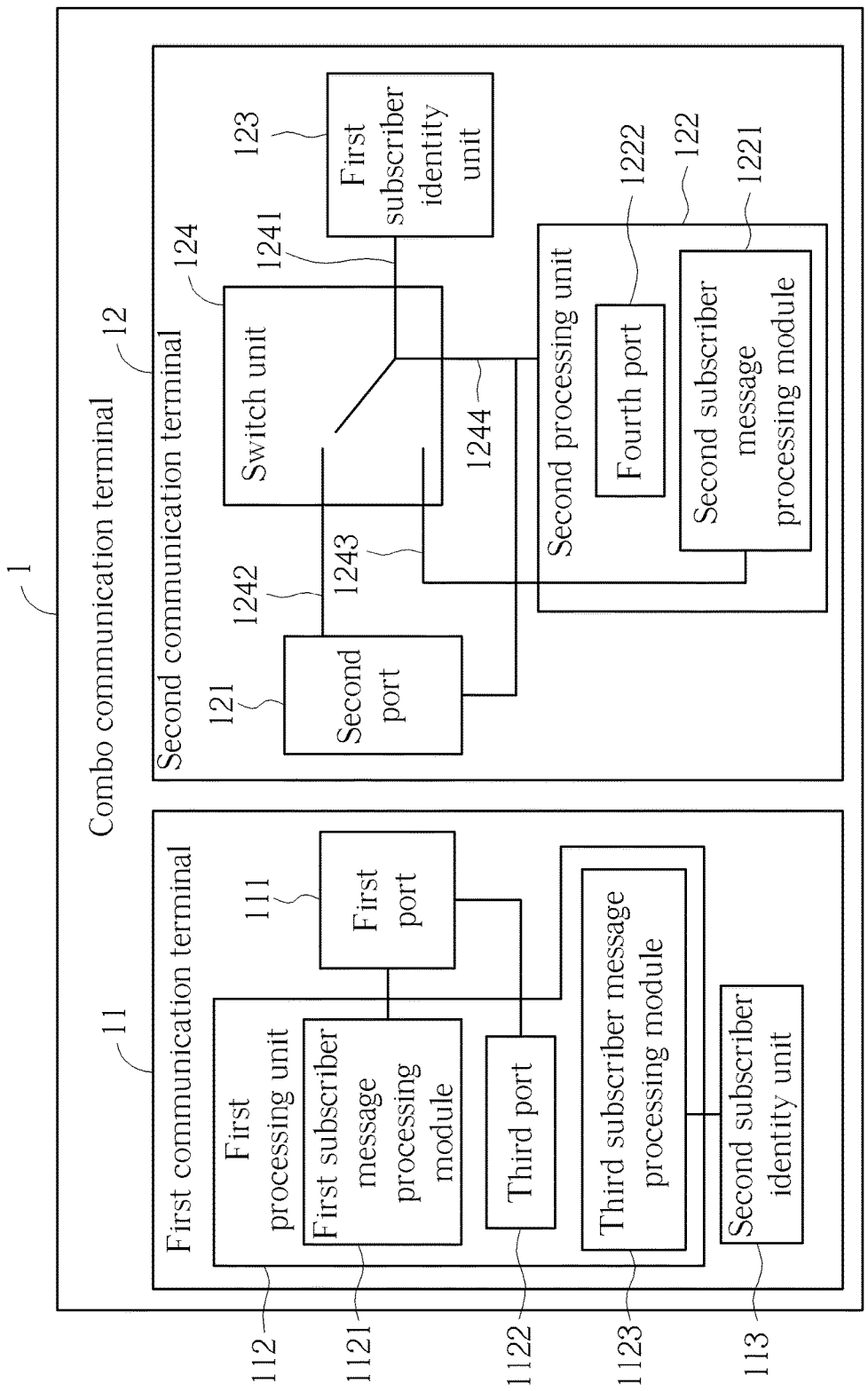
FIG. 4 is a functional block diagram of a combo communication terminal according to another embodiment of the present invention.

FIG. 4 is a functional block diagram of a combo communication terminal 1 according to another embodiment of the present invention. Different from the combo communication terminal 1 in FIG. 1, the first processing unit 112 of the combo communication terminal 1 in FIG. 4 comprises a first subscriber message processing module 1121. The first subscriber message processing module 1121 is coupled to the first port 111. The second processing unit 122 comprises a second subscriber message processing module 1221, and the second subscriber message processing module 1221 is coupled to the third end 1243. When the communication link between the first communication terminal 11 and second communication terminal 12 has been established, the first communication terminal 11 uses the first subscriber message processing module 1121 to obtain a message of the first subscriber identity unit 123, and uses the message of the first subscriber identity unit 123 to perform tasks of communication. When the communication link between the first communication terminal 11 and second communication terminal 12 has not been established, e.g. the communication link is removed, the second communication terminal 12 uses the second subscriber message processing module 1221 to obtains the message of the first subscriber identity unit 123 and uses the message of the first subscriber identity unit 123 to perform tasks of communication.

As shown in FIG. 4, the first processing unit 112 may further comprise a third port 1122 coupled to the first port 111. When the first processing unit 112 detects that the communication link between the first communication terminal 11 and the second communication terminal 12 has been established, the first processing unit 112 transmits a switch signal via the third port 1122. The switch signal is transmitted through the first port 111 and the second port 121 to the second processing unit 122. When the second processing unit 122 receives the switch signal, the second processing unit 122 generates the first control signal.

When the second processing unit 122 detects that the communication link between the first communication terminal 11 and the second communication terminal 12 has been established, the second processing unit 122 generates the first control signal.

The second processing unit 122 may further comprise a fourth port 1222 coupled to the control end 1244 and the second port 121. The second processing unit 122 transmits the control signal to the control end 1244 through the fourth port 1222.

As shown in FIG. 4, the first communication terminal 11 may further comprise at least a second subscriber identity unit 113, and the first processing unit 112 may further comprise at least a third subscriber message processing module 1123 corresponding to the at least a second subscriber identity unit 113. In FIG. 4, a single second subscriber identity unit 113 and a single third subscriber message processing module 1123 are illustrated for exemplary embodiment. Each of the at least a third subscriber message processing module 1123 is coupled to the at least a second subscriber identity unit 113. The third subscriber message processing module 1123 is configured to obtain a message of a corresponding one of the at least a second subscriber identity unit 113.

In an embodiment of the present invention, the first communication terminal 11 may comprise a single second subscriber identity unit 113, the first processing unit 112 may comprise a single third subscriber message processing module 1123, and the third subscriber message processing module 1123 is coupled to the second subscriber identity unit 113. Accordingly, when the communication link between the first communication terminal 11 and the second communication terminal 12 has been established, the first communication terminal 11 is equal to a communication terminal with two operable standby SIM cards. Moreover, since the first communication terminal 11 is directly coupled to the first subscriber identity unit 123, when the first communication terminal 11 uses the first subscriber identity unit 123 to perform tasks of communication, other modules of the second communication terminal 12 are not required. Therefore, modules related to the first subscriber identity unit 123 in the second communication terminal 12 could rest to reduce power consumption, and it is convenient for the user. As a result, even though the second communication terminal 12 is in a turn-off mode or a sleep mode, the first communication terminal 11 may still use the first subscriber identity unit 123 to perform tasks of communication. When the communication link between the first communication terminal 11 and the second communication terminal 12 has been removed, the first communication terminal 11 is equal to a communication terminal with a single SIM card.

Figure 5:
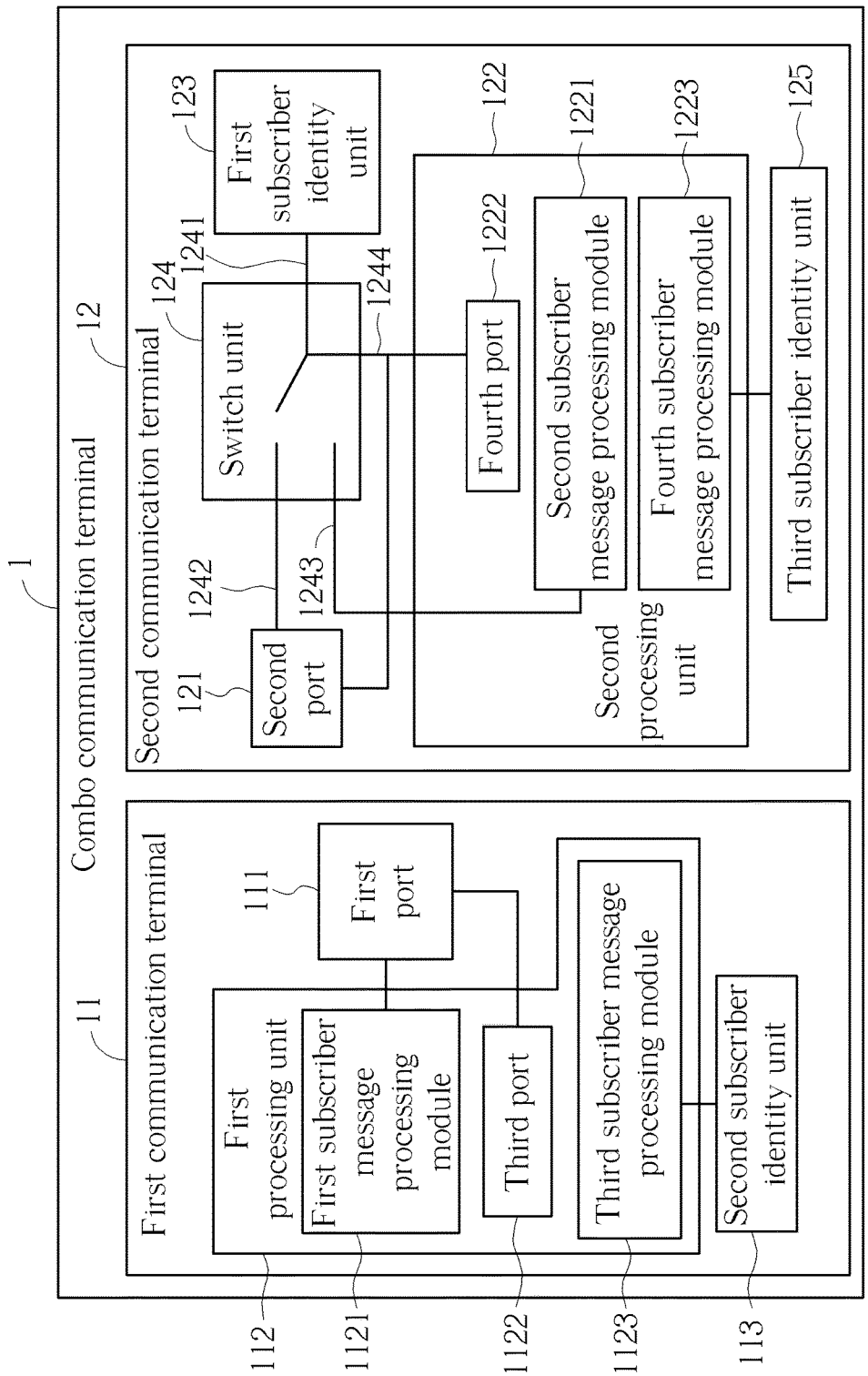
FIG. 5 is a functional block diagram of a combo communication terminal according to another embodiment of the present invention.

FIG. 5 is a functional block diagram of a combo communication terminal 1 according to another embodiment of the present invention. In the embodiment, the second communication terminal 12 may further comprise at least a third subscriber identity unit 125, and the second processing unit 122 may further comprise at least a fourth subscriber message processing module 1223 corresponding to the at least a third subscriber identity unit 125. Each of the at least a fourth subscriber message processing module 1223 is coupled to the at least a third subscriber identity unit 125. In FIG. 5, a single third subscriber identity unit 125 and a single fourth subscriber message processing module 1223 are illustrated for an exemplary embodiment.

Figure 6:
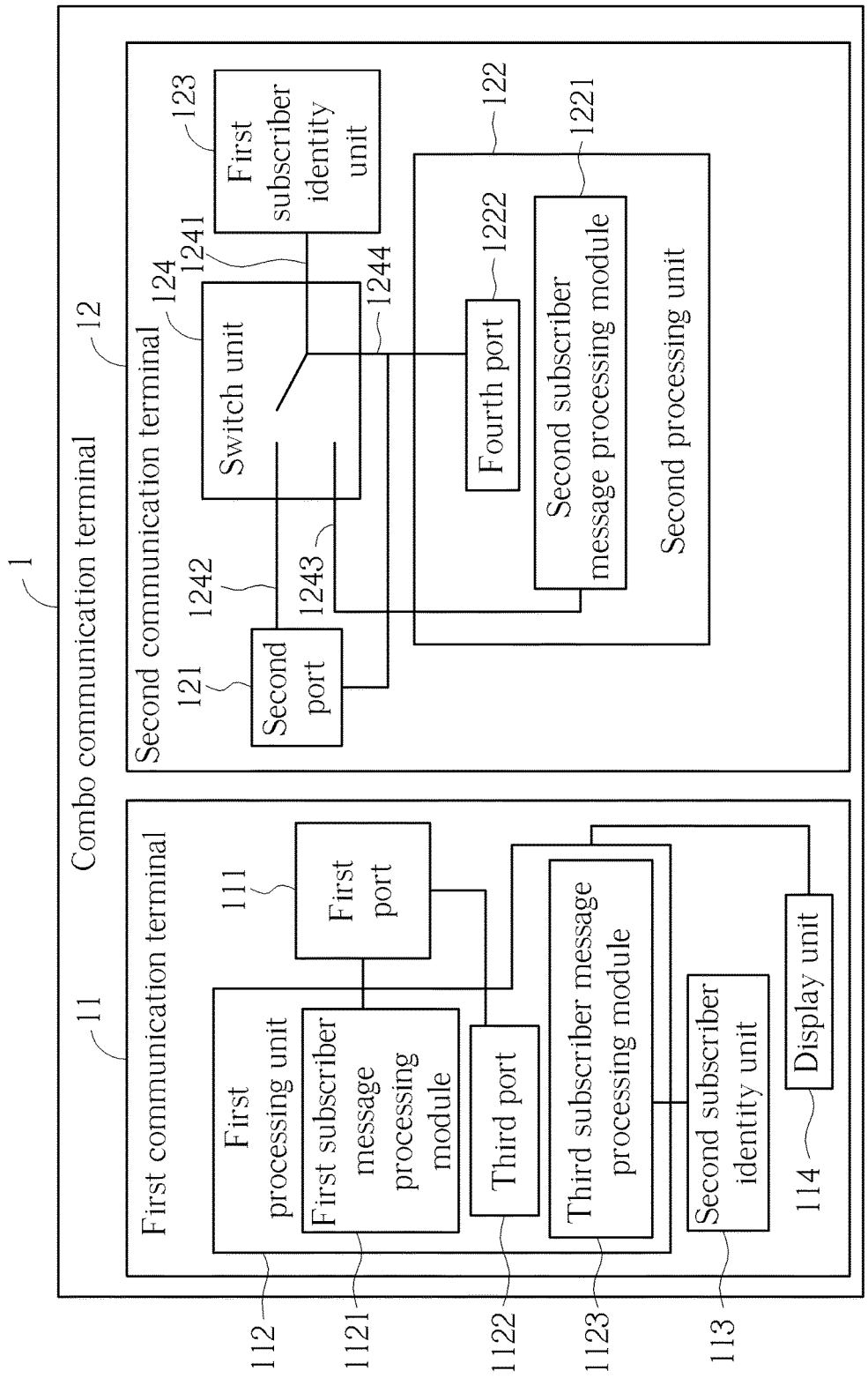
FIG. 6 is a functional block diagram of a combo communication terminal according to another embodiment of the present invention.

FIG. 6 is a functional block diagram of a combo communication terminal 1 according to another embodiment of the present invention. In the embodiment, the first communication terminal 11 further comprises a display unit 114 coupled to first processing unit 112. When the first processing unit 112 detects that the communication link between the first communication terminal 11 and the second communication terminal 12 has been removed, the first processing unit 112 transmits a hint message to the display unit 114 for determining whether a call transfer should be performed. The subscriber may determine whether the call transfer should be performed according to the hint message. When the subscriber determines to perform the call transfer, the first processing unit 112 transfers a call of one of the at least a second subscriber identity unit 113 to the second communication terminal 12 according to the determination of the subscriber. When the subscriber determines to perform the call transfer and the first communication terminal 11 comprises a single second subscriber identity unit 113, the first processing unit 112 transfers a call of the single second subscriber identity unit 113 to the second communication terminal 12. Accordingly, when the subscriber only carries the second communication terminal 12, it is assured that the subscriber could receive the communication requests (e.g. a request for answering the call) of the second subscriber identity unit 113 of the first communication terminal 11, and it is convenient for the subscriber.

The first processing unit 112 may be further configured to transmit a third control signal, and the second processing unit 122 may be further configured to receive the third control signal and control the second communication terminal 12 to be in a turn-off mode or a sleep mode according to the third control signal. Particularly, when the first processing unit 112 detects that the communication link between the first communication terminal 11 and the second communication terminal 12 has been established, the first processing unit 112 transmits the third control signal. Accordingly, without influencing the first communication terminal 11 to use the first subscriber identity unit 123 to perform tasks of communication, power consumption of the second communication terminal 12 may be reduced.

The second processing unit 122 may also control the second communication terminal 12 to be in a turn-off mode or a sleep mode when the second processing unit 122 detects that the communication link between the first communication terminal 11 and the second communication terminal 12 has been established and the first subscriber identity unit 123 is coupled to the second port 121. Accordingly, without influencing the first communication terminal 11 to use the first subscriber identity unit 123 to perform tasks of communication, power consumption of the second communication terminal 12 may be reduced.

The first port 111 may be a port with a USB (Universal Serial Bus) port, and the second port 121 may be a port with a USB port matching the first port 111. If the first port 111 comprises the USB port, and the second port 121 comprises the USB port matching the first port 111, when the communication link between the first communication terminal 11 and the second communication terminal 12 has been established via the first port 111 and the second port 121, the first communication terminal 11 may provide electric power to the second communication terminal 12.

Figure 7:
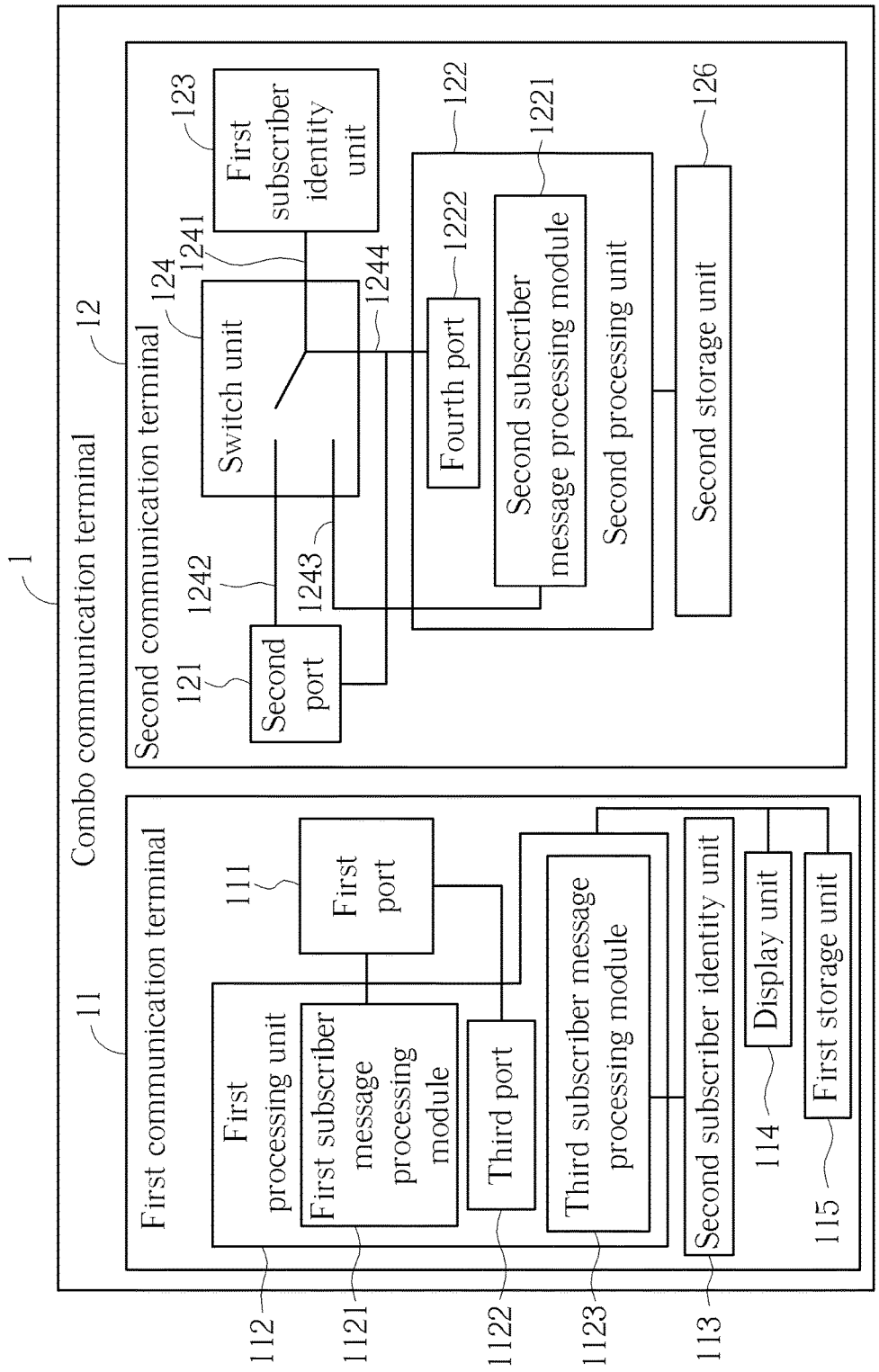
FIG. 7 is a functional block diagram of a combo communication terminal according to another embodiment of the present invention.

FIG. 7 is a functional block diagram of a combo communication terminal 1 according to another embodiment of the present invention. In the embodiment, the first communication terminal 11 further comprises a first storage unit 115, and the second communication terminal 12 further comprises a second storage unit 126. When the communication link between the first communication terminal 11 and the second communication terminal 12 has been established, the first processing unit 112 further controls the second storage unit 126, and the second processing unit 122 further controls the first storage unit 115. Accordingly, subscriber experience is improved. For example, when the communication link between the first communication terminal 11 and the second communication terminal 12 has been established, the first communication terminal 11 may read and modify graphic messages stored in the second communication terminal 12. Similarly, the second communication terminal 12 may read and modify graphic messages stored in the first communication terminal 11.

It should be noted that, in the embodiments of FIGS. 4 to 7, the first port 111 and the second port 121 match with each other, the first port 111 may comprise a port matching with the first subscriber message processing module 1121 and the third port 1122, and the second port 121 may comprise a port matching with the second subscriber message processing module 1221 and the fourth port 1222.

Basically, the switch unit 124 may be an element comprising a single port double throw (SPDT) switch. The third port 1122 and the fourth port 1222 may be GPIO (General Purpose Input Output) ports. Any of the subscriber identity units may be a SIM card or a UIM (User Identity Module) card. The first communication terminal 11 or the second communication terminal 12 which uses the subscriber identity unit to perform tasks of communication may include: the first communication terminal 11 or the second communication terminal 12 using the subscriber identity unit to call, receive/transmit a short message, access Internet, etc.

It should be noted that the first communication terminal 11 may be a large communication terminal of a separable combo communication terminal, and the second communication terminal 12 may be a small communication terminal of the separable combo communication terminal. The first communication terminal 1 may have a slot, and the second communication terminal 12 may be positioned in the slot. The first port 111 may be placed in the slot, and the second communication terminal 12 may be coupled to the first communication terminal 11 via the second port 121 and the first port 111. In other embodiments of the present invention, the first communication terminal 11 may be a tablet computer, and the second communication terminal 12 may be a smart phone. However, the present invention is not limited thereto.

The combo communication terminal of the present invention comprises the first communication terminal and the second communication terminal. The first communication terminal comprises the first processing unit and the first port. The second communication terminal comprises the switch unit, the first subscriber identity unit, the second processing unit and the second port. When the communication link between the first communication terminal 11 and the second communication terminal 12 has been established, the second processing unit may control the switch unit to couple the first subscriber identity unit of the second communication terminal to the first processing unit of the first communication terminal, such that the first communication terminal may use the first subscriber identity unit to perform tasks of communication, and that the first communication terminal is directly coupled to the second communication terminal via the ports. Accordingly, the first communication terminal is coupled to the first subscriber identity unit through the ports, and stability of communications between the first communication terminal and the first subscriber identity unit would be assured. Therefore, when the first communication terminal uses the first subscriber identity unit to perform tasks of communication, other modules of the second communication terminal would not be used. As a result, even though the second communication terminal is in a turn-off mode or a sleep mode, the first communication terminal also can use the first subscriber identity unit to perform tasks of communication.

Figure 8:
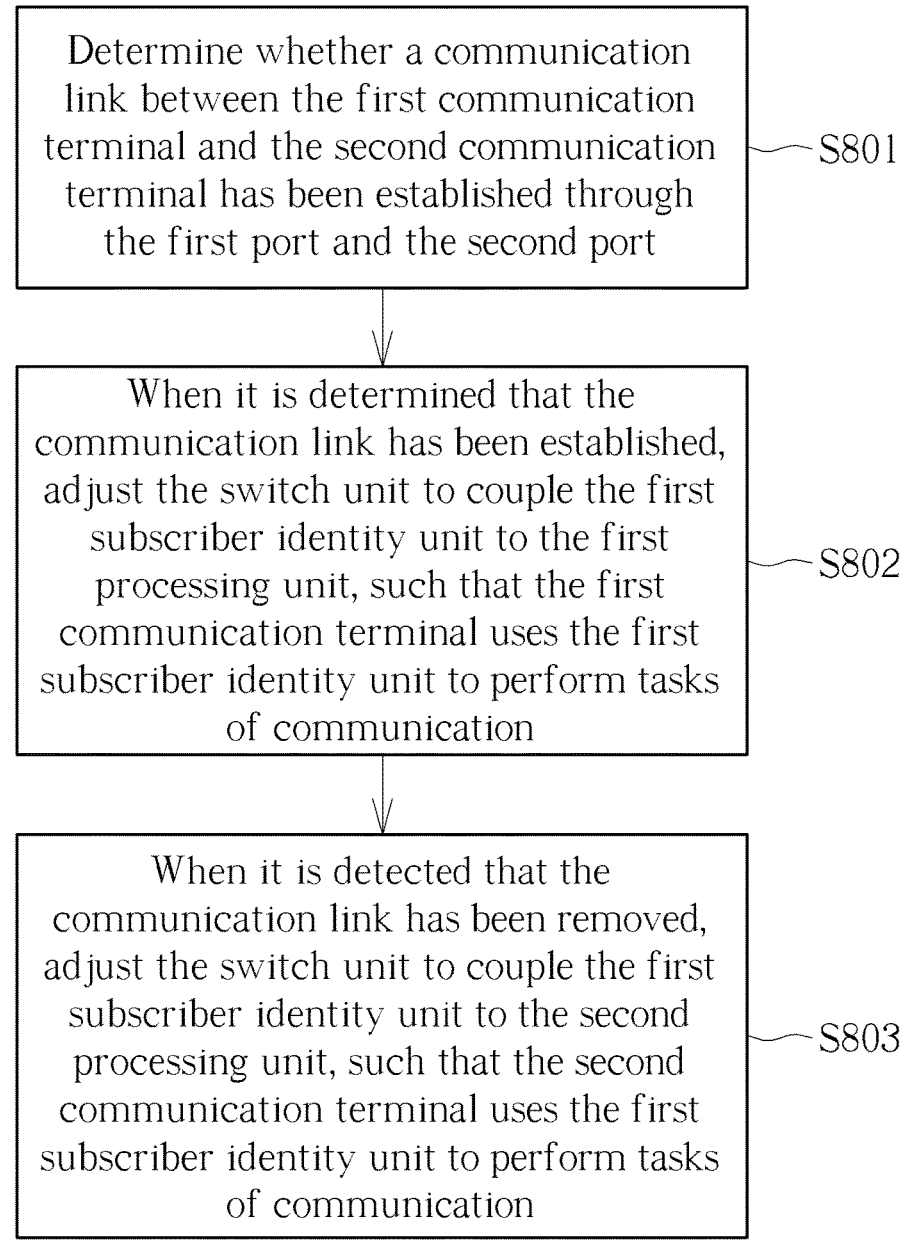
FIG. 8 is a flow chart of a communication method of a combo communication terminal according to an embodiment of the present invention.

FIG. 8 is a flow chart of a communication method of a combo communication terminal according to an embodiment of the present invention. The communication method is adopted in a second communication terminal of the combo communication terminal, and the combo communication terminal further comprises the first communication terminal 11. The communication method comprises steps of:

S801: Determining whether a communication link between the first communication terminal 11 and the second communication terminal 12 has been established through the first port 111 and the second port 121; and S802: When it is determined that the communication link has been established, adjusting the switch unit 124 to couple the first subscriber identity unit 123 to the first processing unit 112, such that the first communication terminal 11 uses the first subscriber identity unit 123 to perform tasks of communication.

In an embodiment of the present invention, the first processing unit 112 comprises the first subscriber message processing module 1121, and the step S802 comprises: when it is determined that the communication link has been established, adjusting the switch unit 124 to couple the first subscriber identity unit 123 to the first subscriber message processing module 1121, such that the first communication terminal 11 uses the first subscriber identity unit 123 to perform tasks of communication. Wherein, when it is detected that communication link between the first communication terminal 11 and the second communication terminal 12 has been established through the first port 111 and the second port 121, the second communication terminal 12 may determine that the communication link has been established. When the second communication terminal 12 receives a switch signal, the second communication terminal 12 may determine that the communication link has been established. Wherein, the switch signal is transmitted from the first communication terminal 11 to the second communication terminal 12 when the first communication terminal 11 detects that the communication link with the second communication terminal 12 has been established through the first port 111 and the second port 121.

The communication method may further comprises a step of:

S803: When it is detected that the communication link between the first communication terminal 11 and the second communication terminal 12 has been removed, adjusting the switch unit 124 to couple the first subscriber identity unit 123 to the second processing unit 122, such that the second communication terminal 12 uses the first subscriber identity unit 123 to perform tasks of communication.

In an embodiment of the present invention, the second processing unit 122 comprises the second subscriber message processing module 1221, and the step S803 comprises: when it is detected that the communication link has been removed, adjusting the switch unit 124 to couple the first subscriber identity unit 123 to the second subscriber message processing module 1221, such that the second communication terminal 12 uses the first subscriber identity unit 123 to perform tasks of communication.

When the first communication terminal 11 comprises a second subscriber identity unit 113, and the first subscriber identity unit 123 is coupled to the first processing unit 112, the first communication terminal 11 may selectively use the first subscriber identity unit 123 or the second subscriber identity unit 113 to perform tasks of communication. That is, when the communication link between the first communication terminal 11 and the second communication terminal 12 has been established, the first communication terminal 11 is equal to a communication terminal with two operable standby SIM cards.

In addition, when the first communication terminal 11 comprises at least a second subscriber identity unit 113, and the first subscriber identity unit 123 is coupled to the first processing unit 112, the first communication terminal 11 may selectively use the first subscriber identity unit 123 or any one of the at least a second subscriber identity unit 113 to perform tasks of communication.

The communication method of the present invention may be adopted in the combo communication terminal. The combo communication terminal comprises the first communication terminal and the second communication terminal. The first communication terminal comprises the first port and the first processing unit. The second communication terminal comprises the switch unit, the first subscriber identity unit and the second port. When the communication link between the first communication terminal and the second communication terminal has been established through the first port and the second port, the second communication terminal controls the switch unit to couple the first subscriber identity unit of the second communication terminal to the first processing unit of the first communication terminal, so that the first communication terminal uses the first subscriber identity unit to perform tasks of communication. Moreover, the first communication terminal and the second communication terminal are coupled by using the ports directly, such that the first communication terminal is coupled to the first subscriber identity unit via the ports. Accordingly, stability of communications between the first communication terminal and the first subscriber identity unit would be assured. Therefore, when the first communication terminal uses the first subscriber identity unit to perform tasks of communication, other modules of the second communication terminal would not be used. As a result, even though the second communication terminal is in a turn-off mode or a sleep mode, the first communication terminal also can use the first subscriber identity unit to perform tasks of communication.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A combo communication terminal, comprising:
    a first communication terminal, comprising:
        a first port;
        a second subscriber identity unit; and
        a first processing unit, coupled to the first port; and
    a second communication terminal, comprising:
        a second port;
        a first subscriber identity unit;
        a second processing unit, coupled to the second port; and
        a switch unit, having a first end, a second end, a third end and a control end, the first end being coupled to the first subscriber identity unit, the second end being coupled to the second port, the third end and the control end being coupled to the second processing unit, and the control end being configured to selectively couple the first end to the second end or to the third end according to a control signal;
    wherein when a communication link between the first communication terminal and the second communication terminal is established through the first port and the second port, the second processing unit generates a first control signal and transmits the first control signal to the control end, such that the first subscriber identity unit is coupled to the second port and the first processing unit is coupled to the first subscriber identity unit through the first port, so that the first communication terminal has the first subscriber identity unit and the second subscriber identity unit as two operable standby units;
    wherein even though the second communication terminal is in a turn-off mode or a sleep mode, the mode of the second communication terminal does not influence the first communication terminal to use the first subscriber identity unit to perform tasks of communication when the first communication terminal uses the first subscriber identity unit to perform tasks of communication.

2. The combo communication terminal of claim 1, wherein when the communication link between the first communication terminal and the second communication terminal is removed, the second processing unit generates a second control signal and transmits the second control signal to the control end, such that the second processing unit is coupled to the first subscriber identity unit through the third end, so that the second communication terminal uses the first subscriber identity unit to perform tasks of communication.

3. The combo communication terminal of claim 1, wherein the first processing unit comprises a first subscriber message processing module coupled to the first port and configured to obtain a message of the first subscriber identity unit;
    wherein when the communication link between the first communication terminal and the second communication terminal is established, the first communication terminal obtains the message of the first subscriber identity unit via the first subscriber message processing module and uses the message of the first subscriber identity unit to perform tasks of communication.

4. The combo communication terminal of claim 2, wherein the second processing unit comprises a second subscriber message processing module coupled to the third end;
wherein when the communication link between the first communication terminal and the second communication terminal is removed, the second communication terminal obtains the message of the first subscriber identity unit via the second subscriber message processing module and uses the message of the first subscriber identity unit to perform tasks of communication.

5. The combo communication terminal of claim 1, wherein the first processing unit comprises a third port coupled to the first port, and the second processing unit further comprises a fourth port coupled to the control end and the second port;
wherein when the first processing unit detects that the communication link between the first communication terminal and the second communication terminal is established, the first processing unit transmits a switch signal through the third port, the first port, the second port and the fourth port to the second processing unit;
wherein the second processing unit generates the first control signal when the second processing unit receives the switch signal.

6. The combo communication terminal of claim 5, wherein the third port and the fourth port are general purpose input output (GPIO) ports.

7. The combo communication terminal of claim 1, wherein when the second processing unit detects that the communication link between the first communication terminal and the second communication terminal has been established, the second processing unit generates the first control signal.

8. The combo communication terminal of claim 1, wherein when the first communication terminal uses the first subscriber identity unit to perform tasks of communication, the second processing unit controls the second communication terminal to be in a turn-off mode or a sleep mode.

9. The combo communication terminal of claim 8, wherein when the communication link between the first communication terminal and the second communication terminal is established, the first processing unit transmits a third signal, and the second processing unit receives the third signal and controls the second communication terminal to be in the turn-off mode or the sleep mode.

10. The combo communication terminal of claim 8, wherein when the second processing unit detects that the communication link between the first communication terminal and the second communication terminal has been established and that the first subscriber identity unit is coupled to the second port, the second processing unit controls the second communication terminal to be in the turn-off mode or the sleep mode.

11. The combo communication terminal of claim 1, wherein the first processing unit further comprises a third subscriber message processing module coupled to the second subscriber identity unit, and configured to obtain a message of the second subscriber identity unit.

12. The combo communication terminal of claim 11, wherein the first communication terminal further comprises a display unit, when the first processing unit detects that the communication link between the first communication terminal and the second communication terminal has been removed, the first processing unit transmits a hint message to the display unit for determining whether a call transfer should be performed.

13. The combo communication terminal of claim 1, wherein the first communication terminal further comprises a first storage unit, and the second communication terminal further comprises a second storage unit, when the communication link between the first communication terminal and the second communication terminal is established, the first processing unit controls the second storage unit, and the second processing unit controls the first storage unit.

14. The combo communication terminal of claim 1, wherein the first port comprises a general purpose input output (GPIO) port, and the second port comprises another GPIO port corresponding to the first port, when the communication link between the first communication terminal and the second communication terminal is established, the first communication terminal provides electric power to the second communication terminal.

* * * * *